United States Patent [19]

Aulehla

[11] Patent Number: 4,957,249
[45] Date of Patent: Sep. 18, 1990

[54] THRUST VECTOR CONTROL FLAP WITH A MERGING CONVEX, CONCAVE INNER CONTOUR, FOR JET AIRCRAFT AND METHOD FOR OPERATING THE SAME

[75] Inventor: Felix Aulehla, Weyarn, Fed. Rep. of Germany

[73] Assignee: Messerschmitt-Boelkow-Blohm GmbH, Munich, Fed. Rep. of Germany

[21] Appl. No.: 331,269

[22] Filed: Mar. 30, 1989

[30] Foreign Application Priority Data

Apr. 7, 1988 [DE] Fed. Rep. of Germany ....... 3811616

[51] Int. Cl.$^5$ ............................................. B64C 29/00
[52] U.S. Cl. ................................. 244/23 D; 244/12.5; 239/265.19; 60/230
[58] Field of Search .............. 244/203, 52, 12.5, 23 D; 239/265.11, 265.19; 60/228, 230

[56] References Cited

U.S. PATENT DOCUMENTS

| | | | |
|---|---|---|---|
| 3,045,947 | 7/1962 | Bertin et al. | 244/52 |
| 3,414,195 | 12/1968 | Saunders | 239/265.11 |
| 4,052,007 | 10/1977 | Willard | 239/265.29 |
| 4,074,878 | 2/1978 | Sherman | 244/203 |
| 4,182,501 | 1/1980 | Fage | 239/265.19 |
| 4,316,721 | 2/1982 | Weiss et al. | 239/265.19 |
| 4,610,213 | 9/1986 | Walker | 244/203 |
| 4,654,140 | 2/1987 | Bevilaqua et al. | 239/265.11 |

Primary Examiner—Joseph F. Peters, Jr.
Assistant Examiner—Christopher P. Ellis
Attorney, Agent, or Firm—W. G. Fasse; D. H. Kane, Jr.

[57] ABSTRACT

A thrust vector control for a jet engine is accomplished by controllable flaps which have an inner, jet flow facing contour with a double curvature. One curvature section is convex and extends between the leading edge of the flap and a transition point. The other curvature section is concave and extends between the transition point and the trailing edge of the flap. The flap or flaps are arranged downstream of the propulsion jet nozzle and are tilted into the jet stream as required for the vector control. A pressure sensor is arranged so as to measure or pick-up a pressure value, preferably near the trailing edge of the flap, which pressure value depends on the dynamic pressure head in that area. The respective pressure value is used in a closed loop control circuit for operating the tilting drive of the respective flap.

8 Claims, 3 Drawing Sheets

THRUST VECTOR CONTROL FLAP WITH A MERGING CONVEX, CONCAVE INNER CONTOUR, FOR JET AIRCRAFT AND METHOD FOR OPERATING THE SAME

Field OF THE INVENTION

The invention relates to a thrust vector control device for improving the maneuverability of jet aircraft, especially high performance combat aircraft. The invention also relates to a method for operating the device.

BACKGROUND INFORMATION

The control of the thrust vector by means of tiltable flaps is known, for example, from U.S. Pat. No. 4,052,007 (Willard). The control flaps are journalled to the jet engine housing or to the aircraft frame or cell. First flaps are operated to tilt these flaps into the exhaust jet, thereby changing the cross-sectional flow area of the exhaust or thrust jet. The nozzle exit configuration in the above mentioned U. S. Patent is rectangular. Thus, two second flaps arranged opposite each other are sufficient for the thrust control. The first flaps are displaceable in guide means for varying the nozzle exit cross-sectional flow area. The two second flaps tiltable about axes rigidly secured to the propulsion plant, are located downstream of the two first mentioned flaps for the jet deflection and/or for the thrust reversal. These additional flaps are tilted substantially in the same direction for the jet deflection. For a thrust reversal these flaps are tilted symmetrically toward each other, that is, in opposite directions. The inner contour of these flaps facing the propulsion jet is substantially straight or flat along most of the flap length, except for a leading edge zone which is slightly curved outwardly away from the flat straight surface of the flap. As shown in FIG. 4 of U.S. Pat. No. 4,052,007 substantial flap angles are necessary when the nozzle exit opening is reduced to its minimum by the upstream, first flaps. The large flap angles are necessary to achieve an effective jet deflection. An effective jet deflection cannot be achieved by smaller flap angles because of the fixed location of the journal axes or tilting axes of these deflection flaps. Tests have shown that such large flap deflection angles are undesirable because if there is an impinging angle of more than 30° between the edge of the jet jet stream and the inner contour of the flap, a partial reverse flow of the jet stream results. An unintended reversal flow can basically be compared with the operation situation of intended thrust reversal, please see also FIG. 6 of Willard's disclosure. Such a thrust reversal, even if it is only partial, is undesirable in connection with the thrust vector control because the jet portion that is deflected by more than 90° blows off toward the leading edge of the flap and causes a thrust loss as well as a cross-force loss. As a result, the propulsion plant or the cell may be exposed to thermal and mechanical loads that are undesirable. In order to avoid dead zones, in other words, to avoid undesirable reaction delays, it is conventional to keep the jet deflection flaps in such a position that they constantly contact the jet edge. As a result, the flaps are subject to substantial thermal loading, although the ejector effect makes possible a limited cooling of the flaps, see FIG. 5 of U.S. Pat. No. 4,052,007.

In spite of such cooling, due to the ejector effect, the thermal loading is so large that only expensive high heat resistant materials can be used for making the flaps.

It is possible to control the flap position relative to all relevant flight maneuvers and relative to all propulsion plant situations. For this purpose it is, however, necessary to ascertain the location of the jet edge and to store corresponding information in the on-board computer for controlling the flap position, or rather adjusting the flap position. The sensing of the jet edge, however, is extremely involved and hence expensive if it is intended to ascertain the jet edge for all necessary flight conditions.

OBJECTS OF THE INVENTION

In view of the above it is the aim of the invention to achieve the following objects singly or in combination:

to provide a thrust vector control for a jet engine which avoids the above drawbacks, and improving the maneuverability of jet propelled aircraft while simultaneously improving the efficiency of the thrust vector control;

to avoid jet flow reversals and dead zones in order to prevent undesirable thermal and mechanical load conditions on the engine and related structures;

to provide simple means for ascertaining the jet edge and to control the flap position in response to the location of the jet edge; and to relieve the jet deflection flaps of thermal load as much as possible to increase their useful life and to enlarge the range of materials that may be used for making these jet deflection flaps for the thrust vector control.

SUMMARY OF THE INVENTION

The thrust vector control device according to the invention is characterized in that the inner contour of the flap facing the exhaust gas jet is provided with a first convex curvature near its leading edge and with a second concave curvature near its trailing edge. The two curvatures merge into each other in a transition point. A pressure sensor is so located that it can sense the edge of the jet flow. Preferably, the pressure sensor is located near the trailing edge of the control flap. The pressure sensor measures a pressure value which depends on the local dynamic pressure head and the pressure value so ascertained is used to control the motion of the deflection control flap.

The present thrust vector control device is controlled according to the invention as follows. During normal flight, that is when the exhaust jet is not deflected, the flaps are maintained in a position outside the jet edge of the exhaust jet. Thus, during normal flight the control flaps are protected against excessive heat exposure. Just prior to an extreme flight maneuver, the flaps are moved so that their concave contour section near the trailing edge of the flap contacts the jet edge, whereby the flaps may, if desired, locally restrict the cross-sectional flow area of the exhaust jet. Thereafter, for performing an extreme flight maneuver, the control flaps are brought into the position necessary for the desired jet deflection. The initial control for bringing the flap into a position in which its contour contacts the jet edge, is accomplished in response to dynamic pressure head measurements performed by the pressure sensor located in a suitable position for this purpose in the control flaps, preferably near the trailing edge of these control flaps.

The special shape of the inner contour of the control flaps according to the invention with two different curvature sections and a transition point between the two curvature sections makes it possible to obtain sufficient deflections and hence sufficient cross-forces without a reverse flow of the jet stream. Reversal of the jet stream is avoided because the impingement angle of the jet edge relative to the inner contour of the flap is smaller than in connection with flaps having a straight inner contour or flaps which only have a slightly curved portion near the leading edge and which have leading and trailing edges located in the same positions as the respective leading and trailing edge of flaps according to the invention with a double curvature. In a control device with flaps according to the invention the point of impingement of the jet edge on the inner contour of the flaps is located further upstream of the respective impingement point in conventional flap contours when these flaps are in the same position as the flaps according to the invention. The feature that the flaps according to the invention are located outside the jet edge during normal flight contributes significantly to reducing the thermal stresses in the present flaps.

The pressure sensor of the invention located preferably in the zone near the trailing edge of the flap or flaps provides a pressure signal in response to the dipping of the flaps into the exhaust gas jet, whereby a simple and reliable device is obtained for contacting the jet edge with the flaps and for a follow-up control of the flaps relative to the jet edge just prior and during extreme flight maneuvers.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
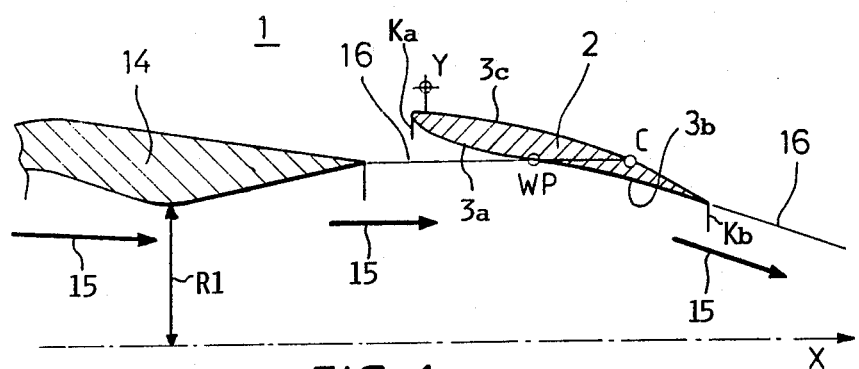
FIG. 1 is a sectional view through the upper portion of an exhaust nozzle with a control flap according to the invention positioned downstream of the nozzle exit.
Figure 2:
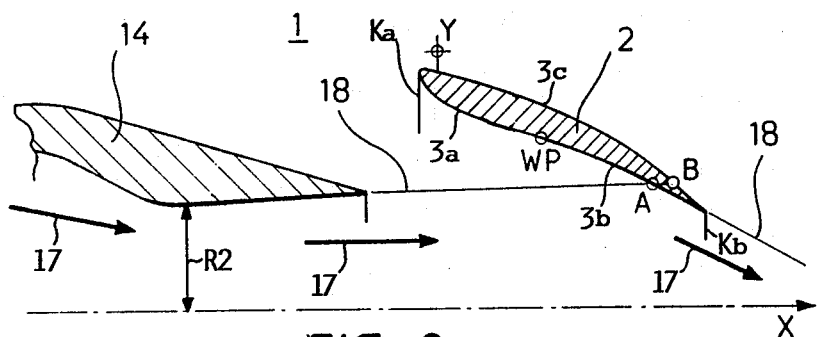
FIG. 2 is a view similar to that of FIG. 2, but illustrating a different operational condition.

FIGS. 1 and 2 show two different operational conditions of the thrust vector control device 1 according to the invention. The illustration of FIG. 1 shows, for example, the operational conditions at a maximal afterburning providing a maximum reheating. In this condition, the exit cross-sectional area of the propulsion nozzle 14 is opened to its maximum extent. The illustration of FIG. 2 illustrates, for example, the so-called dry thrust at partial operational loads up to maximum dry. In this condition the exit cross-sectional area of the thrust nozzle 14 is adjusted to a substantially smaller diameter than in FIG. 1, please compare the spacing R1 in FIG. 1 with the spacing R2 in FIG. 2. These spacings are the distance between the central longitudinal axis X of the thrust nozzle 14 from the narrowest nozzle restriction. The control of the nozzle cross-sectional exit flow area of the thrust nozzle 14 is conventional and hence not shown in any detail. The nozzle cross-sectional shape can also be of any conventional configuration. Rectangular or circular nozzle shapes are conventional and the outer contour of the exhaust gas jet 15 will adapt itself to the nozzle crosssectional configuration.

The thrust vector control is effectively accomplished by control flaps 2 operatively arranged axially downstream of the thrust nozzle 14 as viewed in the flow direction of the thrust or propulsion jet indicated by the arrow 15 in FIG. 1 and by the arrow 17 in FIG. 2. If it is necessary to deflect the exhaust gas jet 15 or 17 in only one direction, it may be sufficient to provide only one deflection control flap 2 for each propulsion engine. However, normally several such flaps 2 will be arranged around the central longitudinal engine axis X and these several flaps are controllable independently of one another by conventional flap control means as, for example, shown in the above mentioned U. S. Patent.

According to the invention the flap or flaps 2 have a leading edge Ka and a trailing edge Kb and an inner contour with two curved sections 3a and 3b. The curved section 3a is convex and extends from the leading edge Ka to a transition point WP. The second curved section 3b has a concave curvature and extends from the transition point WP to the trailing edge Kb. The present flaps are connected to a journal axis Y near the leading edge Ka. flaps are connected to a journal axis Y near the leading edge Ka. The axis Y is rigidly secured to the engine housing or to the airframe. Thus, the flap 2 has only one degree of freedom, namely tilting back and forth about the fixed axis Y. The mechanical means for driving the flap are of conventional construction and may, for example, comprise hydraulic or pneumatic piston cylinder devices, electrically driven ball roller spindles, and the like. These drive means are not part of the invention and hence not shown in detail. Locating the journal axis Y at a fixed radial spacing from the central longitudinal axis X of the engine is satisfactory for practicing the invention. However, more complicated mountings of the tilting axis for the flap or flaps 2 are also possible. For example, the tilting axis for the flap or flaps could be located at the free end of arms which themselves are tiltably arranged. In any event, these mountings are conventional and hence not shown in any detail.

The convex portion 3a of the flap 2 improves the ejector effect or efficiency of the flaps 2, whereby several advantages are achieved according to the invention. First, the flow conditions in the area of the propulsion plant exit are improved. Second, the flaps 2 and the exhaust jet 15 or 17 are cooled by this feature. As a result, the propulsion thrust can be increased under certain circumstances. The convex shape also makes sure that the exhaust jet 15 or 17 or any portion thereof, cannot reach the radially outer contour 3c of the flap 2. Such a condition in which a portion of the exhaust jet reaches the outer contour 3c is undesirable because it has a disadvantageous effect on the cooling and on the control efficiency of the respective flap. The concave section 3b downstream of the transition point WP makes sure that the jet edge 16 in FIG. 1, or 18 in FIG. 2, impinges on the inner contour of the flap 2 at a location closer to the leading edge Ka than was possible heretofore. In FIG. 1 the jet edge 16 impinges on the flap 2 at the transition point WP. On the other hand, in a conventional flap the jet edge would impinge only at a location C. Similarly, in the operational condition shown in FIG. 2, the jet edge 18 impinges on the present flap at the location A while in a conventional flap the impingement would take place only at a point corresponding to point B. As a result, the angle enclosed by the jet edge and the inner contour of the flap is more shallow than was possible heretofore in connection with conventional flaps not having a transition point WP. In this connection it is assumed that the leading edges and the trailing edges of the conventional flap system and of the flap system according to the invention are positioned in the same locations.

Another advantage of the double curved inner contour of the flap according to the invention is seen in that a partial back flow of the exhaust jets 15 or 17 to the leading flap edge can be delayed until larger dead deflection angles have been achieved as compared to conventional systems. The back flow should be avoided as much as possible, or at least delayed because such back flow reduces the longitudinal component as well as the cross-component of the thrust vector. Due to such thrust vector reduction the flaps of conventional contruction, and possibly also the propulsion plant end structure may be exposed to additional thermal and mechanical loads. Tests which have been made with large plates that are flat in the longitudinal direction, that is, they are not provided with the double curvature as disclose herein show that the back flow occurred when the impingement angle between the jet edge and the straight plate surface exceeded 30°. Thus, the flaps 2 should be arranged relative to the thrust nozzle 14 in such a position that the jet edge 16 or 18 impinges on the double curved surface always at an angle that is smaller than 30°. Further, an impingement of the jet edge on the leading edge of the flap 2 should also be avoided. 10 If necessary, the journal axis Y could be located radially further outwardly than is shown in FIGS. 1 and 2.

FIG. 2 shows that the flap 2 must be tilted substantially more than in FIG. 1 because of the smaller cross-sectional area of the exhaust gas jet 17 as compared to that of the jet 15. The point of impingement A of the jet edge or boundary 18 is located downstream of the transition point WP. Even in the impingement point A the jet impingement angle is smaller than for a conventional flap having an inner contour that is substantially straight and for which the point of impingement is located at B, even though the difference is not as pronounced as in FIG. 1.

Figure 6:
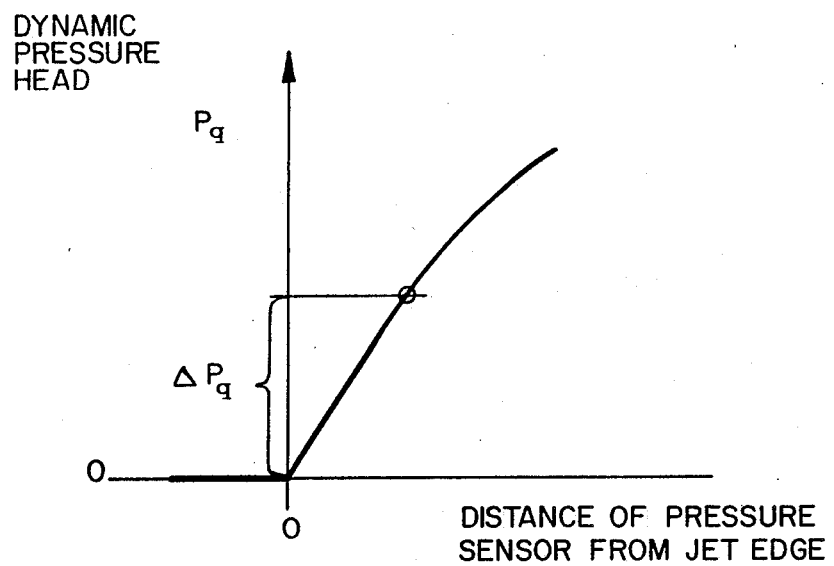
FIG. 6 shows the dynamic pressure head Pq as a function of the distance of the pressure sensor from the jet edge.

In order that the thrust vector control operates without delay when necessary, the flaps according to the invention are caused, just prior to and during each extreme flight maneuver, to contact the jet edge or boundary 16, 18. After contact has been made beween the inner contour of the flap 2 and the jet boundary 16 or 18, a continuous follow-up control is applied to the respective flap. The invention utilizes in this connection the effect that the exhaust gas jet of the propulsion engine has a substantially higher dynamic pressure head than the air flowing along the aircraft frame or rather body. According to the invention the flaps are thus controlled or tilted toward the edge of the exhaust gas jet until the sensor registers a noticeable increase in the dynamic pressure head in the zone or area of the trailing edge of the respective flap. The control of the flap tilting is adapted to the frequently changing jet contour depending on the position of the nozzle exit 14. An optimal adaptation of the follow-up control of the flaps is assured if the dynamic pressure increase $\Delta P_q$ sensed upon contacting the exhaust jet edge or boundary, remains approximately constant as shown in FIG. 6 or if the measured pressure constitutes a constant fraction of the respective nozzle pre-chamber pressure. The follow-up control avoids dead zones and unnecessary cross-sectional flow restrictions for the propulsion jet directly upstream of the jet deflection. During the deflection the flaps 2 are adjusted to that angle which achieves the desired cross force. In this connection it is possible to use the pressure value sensed by the pressure sensors at the flaps, as a measure for the produced cross-force so that the measured value can be introduced as an input signal to the closed loop control circuit for the thrust vector control. This type of cross-force sensing is considered to be more precise, yet simpler than the known measuring of the pressure in the position adjustment piston cylinder device for the flaps because the latter pressure is adversely influenced by mass forces. Upon completion of the jet deflection operation, the flaps are again brought out of contact with the propulsion jet in order to cool the flaps at all times when the deflection control is not required.

Figure 3:
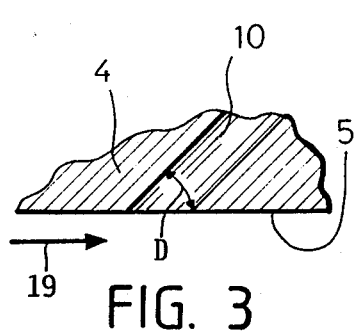
FIG. 3 is a sectional view showing a broken away portion of a control flap according to the invention on a substantially enlarged scale showing the position of a pressure measuring bore near the trailing edge of the control flap.
Figure 4:
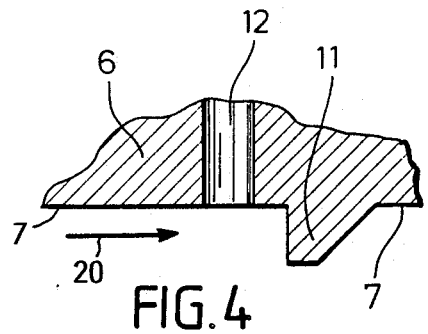
FIG. 4 is a view similar to that of FIG. 3, but showing another arrangement of the pressure sensing bore just upstream of a forward facing step.
Figure 5:
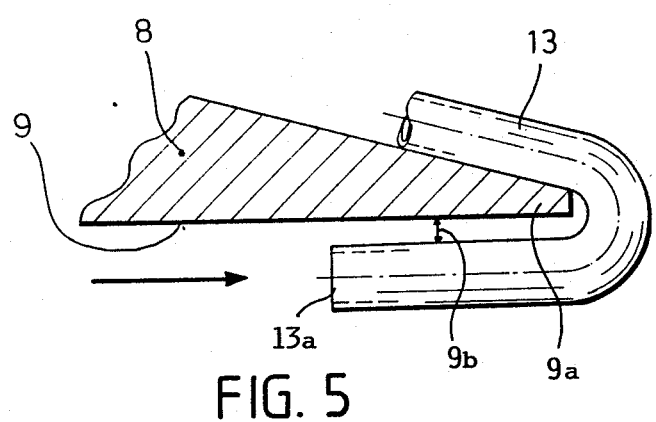
FIG. 5 is a sectional view, also on a substantially enlarged scale, through a trailing edge of a control flap and showing the location of a pressure sensing Pitot-tube.

The pressure sensor or pick-up according to the invention can for example, be provided in the form of pressure sensor channels or bores of which three examples are shown in FIGS. 3, 4, and 5. FIG. 3 shows a slanted pressure sensor bore 10 which encloses an acute angle D with the horizontal or the inwardly facing contour 5 of the flap 4. The inner contour 5 is shown as a straight line due to the substantially enlarged illustration of FIG. 3 as compared to FIGS. 1 and 2. However, the inner contour of the flap 4 will also have the two curved sections as described above. Due to the angle D the inwardly facing opening of the bore 10 faces somewhat in the direction of the jet flow 19.

FIG. 4 shows an embodiment in which the flap 6 has a bore 12 extending substantially perpendicularly to the inner contour 7 of the flap 6 and substantially perpendicularly to the jet flow 20. Here again, the inner contour 7 will have the two curvatures which are not shown due to the enlarged scale. Downstream of the bore 12 there is a forward facing step 11 projecting at the inner contour 7. The forward facing step 11 delays the flow close to the inner contour, whereby the pressure signal to be sensed is amplified and a better response sensitivity is achieved.

FIG. 5 illustrates an embodiment in which the flap 8 has an inner contour 9 and a trailing edge 9a around which a Pitot pressure sensing tube 13 is bent. A certain spacing 9b is provided between the inner contour 9 and the inlet end 13a of the Pitot-tube 13. The spacing 9b corresponds approximately to the boundary layer thickness at this point. The larger pressure in the Pitot-tube in combination with the substantial total pressure gradient across the jet edge or boundary further improves the sensitivity as compared to the embodiment with the pressure head element 11. The Pitot-tube 13 will be made of a heat resistant material.

The embodiments of FIGS. 3, 4, and 5 and any other devices for sensing the pressure as taught by the invention, all employ the same principle, namely that a pressure value is sensed, measured, or picked up, preferably in the zone of the trailing edge of the flap, whereby this pressure value depends on the local dynamic pressure head. This pressure value is then used as an input for the flap closed loop control. The sensing or measuring of the pressure value does not need to be done by the shown three examples. The pressure sensor could, for example, be an inductive pick-up, a capacitive pick-up, a foil strain gage arrangement, or a piezo-quartz.

Although the invention has been described with reference to specific example embodiments it will be appreciated that it is intended to cover all modifications and equivalents within the scope of the appended claims.

What I claim is:

1. A thrust vector control device for jet aircraft, comprising jet nozzle means for producing a propulsion jet, flap means for influencing the flow direction of said propulsion jet, hinge means for hinging said flap means in a position relative to said jet nozzle means for said influencing when said flap means are tilted into said propulsion jet, said flap means comprising a leading edge, a trailing edge, and an inner contour facing said propulsion jet between said leading and trailing edge, said inner contour having a first convex curvature near said leading edge and a second concave curvature near said trailing edge, said first convex curvature merging into said second concave curvature in a transition point, said device further comprising pressure sensor means located for sensing a pressure value dependent on a local pressure head near said inner contour of said flap means to determine a flow edge position of said propulsion jet.

2. The device of claim 1, wherein said pressure sensor means are located near said trailing edge of said flap means.

3. The device of claim 1, wherein said pressure sensor means comprise a pressure measuring bore located in said flap means, said bore opening into said inner contour and extending at a slant into said flap means, said slant slanting with an acute angle relative to a central longitudinal axis of said jet nozzle means to face approximately toward a jet flow. toward a jet flow.

4. The device of claim 3, wherein said pressure measuring bore is located so as to open into said second concave curvature of said inner contour of said flap means near said trailing edge.

5. The device of claim 1, wherein said pressure sensor means comprise a pressure measuring bore located in said flap means and opening into said inner contour, said pressure measuring bore extending in said flap means approximately at a right angle to said inner contour, said device further comprising a forward facing step projecting from said inner contour of said flap means downstream of said pressure measuring bore as viewed relative to a jet flow direction.

6. The device of claim 5, wherein said pressure measuring bore is located so as to open into said second concave curvature of said inner contour of said flap means near said trailing edge.

7. The device of claim 1, wherein said pressure sensor means comprise a Pitot-tube having an opening projecting below said inner contour of said flap means, said opening facing toward a jet flow through said nozzle means.

8. A method for controlling a thrust vector of a propulsion jet by control flap means, comprising the following steps:
    (a) using control flap means having a double curved inner contour facing said propulsion jet with a convex section merging into a concave section,
    (b) sensing a pressure value near said control flap means in response to a dynamic pressure head caused by said propulsion jet for ascertaining a control value representing a jet edge of said propulsion jet,
    (c) keeping said control flap means out of contact with said jet edge and thus outside of said propulsion jet during normal flight,
    (d) just prior to an extreme flight maneuver, causing, in response to said control value, said concave section or a concave section portion of said flap means to contact said jet edge with its trailing edge zone, whereby the flap means slightly dip into said propulsion jet thereby restricting locally the cross-sectional jet flow area, and
    (e) causing said flap means to tilt into the jet during said extreme flight maneuver by a degree that achieves the desired jet deflection.

* * * * *